March 26, 1929.  J. E. MITCHELL  1,707,131
COMBINED COTTON RECLEANER AND GIN
Filed Nov. 25, 1927
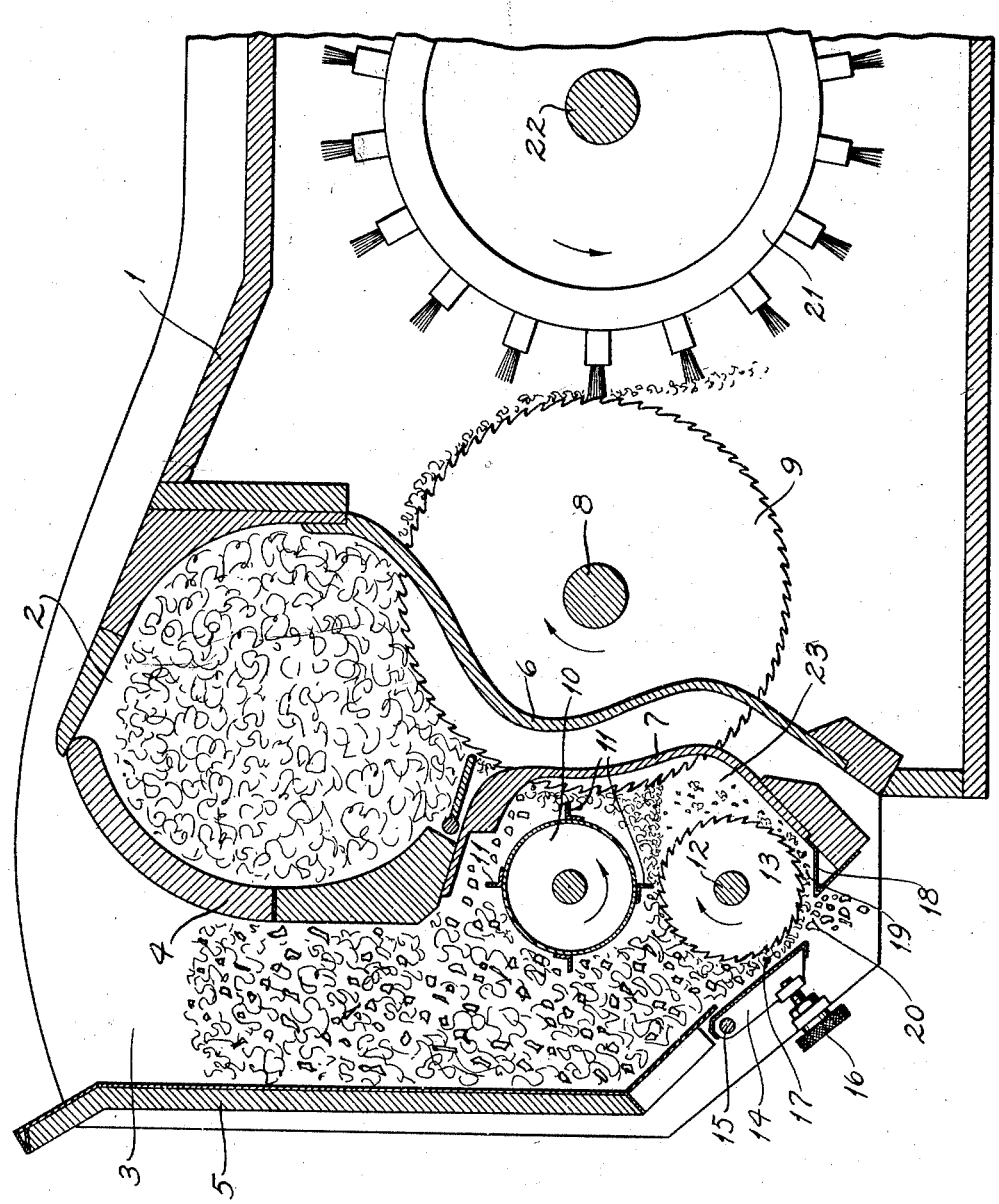
INVENTOR:
JOHN E. MITCHELL.
BY Elliott Harrington
ATTORNEYS.

Patented Mar. 26, 1929.

1,707,131

UNITED STATES PATENT OFFICE.

JOHN E. MITCHELL, OF ST. LOUIS, MISSOURI.

COMBINED COTTON RECLEANER AND GIN.

Application filed November 25, 1927. Serial No. 235,602.

The general object of this invention is to provide an improved cotton gin which is, in effect, a combined cotton gin and cotton cleaning and separating machine, and the invention is directed to the application of cotton cleaning and separating mechanism in the breasts of the huller type of cotton gins.

In the embodiment of my invention shown in the drawing, the improvements are shown as applied to a cotton gin of the double-rib type, but they may equally well be applied to gins equipped with single huller ribs.

The modern huller-rib cotton gins, of either the single or double-rib type, are provided with a picker roller consisting of a drum with spikes rotating toward, or in a direction opposite to the upward movement of, the gin saws which project between the huller ribs and into the breast of the gin. The picker roller is located in such proximity to the revolving gin saws that cotton, with any trash and hulls it may contain, is caught by the spikes of the picker roller and forced against the teeth of the gin saws. These latter carry the cotton up through the spaces between the huller ribs and into the roll box where the cotton is ginned. Any hulls, trash or sticks which may be stripped from the cotton by the huller ribs remain in the breast of the gin and fall back onto the picker roller, the spikes of which force it past the revolving gin saws.

This action of forcing hulls, sticks and the like past the rapidly moving teeth of the gin saws results in considerable shaling, chipping or cutting of the trash, and to such an extent as to materially affect the grade of the cotton being ginned. If, to lessen this chipping or cutting action, the picker roller is backed away from the gin saws, so as to permit of a freer or more rapid discharge of the hulls, trash and the like, then, a certain percentage of small-lock cotton inevitably escapes with the hulls and trash. The amount of the loss or waste of cotton thus escaping depends upon the width of the space between the spikes of the picker roller and the surface of the gin saws necessary to provide for a sufficiently rapid discharge of the hulls and trash which may be contained in the cotton.

My improved gin, disclosed in patent application Ser. No. 211,317, filed August 8th, 1927, was designed to overcome the objections and difficulties referred to above involved in the use of the ordinary picker roller. In that invention, I made use of a feed roll for throwing the cotton, mixed with trash and hulls, against that portion of the gin saws projecting through the huller ribs, the feed roll being positioned far enough away from the gin saws to avoid forcing or holding hulls or other hard substances against the saws, thus overcoming the tendency of the gin saws to cut or chip the hulls, sticks or other trash. The latter, after being separated from the cotton by the huller ribs, together with any small locks of cotton not engaged by the gin saws, fall below the feed roll onto a reclaiming saw, which carries the same under a brush or other yielding member, discharging the trash from the breast of the gin, while returning any reclaimed locks of cotton back to the gin saws, which act as a doffer for the reclaiming saws.

While the improved gin of my application referred to overcomes the objections to the use of picker rollers, some difficulties have been encountered in its use by reason of the fact that there are times, especially during the early part of the season when green cotton is being handled, when the huller ribs will clog or choke at or near the point where the gin saws carry the seed cotton through the spaces between the ribs. When such choking or clogging occurs in the ordinary huller-rib gin, it is customary for the ginner to reach down inside the breast and clear or remove the accumulation with a stick. It is not practicable to do this, however, with the construction of gin disclosed in my application referred to, by reason of the fact that the feed roll is so located that the obstructed part of the huller ribs cannot be reached.

The above objection is overcome by the construction and operation of the present invention, while the cotton is recleaned in a highly efficient manner and any substantial loss thereof prevented.

The leading characteristic of my invention resides in mounting a comparatively small recleaning saw cylinder in the breast of the gin and in providing one or more passages for the discharge of hulls and trash past the moving teeth of the recleaning saws.

Co-operating with the recleaning saw cylinder is a doffer roll which is located above the same and is rotated in the opposite direction to that of the rotation of the gin saws instead of in the same direction, as in the case of the feed roll of the machine of my application referred to. This doffer is preferably located in sufficiently close proximity to the huller ribs as to automatically prevent clogging of the ribs by continuously removing any accumulation of hulls and trash therefrom.

The recleaning saw cylinder is rotated in the same direction as that of the gin saws instead of in the opposite direction, as in the case of the reclaiming saw cylinder of the machine of my application referred to, and is placed in such relation to the gin saws and the doffer roll that the latter will doff the cotton and trash from the recleaning saw cylinder and throw it across a space or working chamber directly onto that portion of the revolving gin saws projecting through the huller ribs.

This arrangement is made possible by the relatively small size of the recleaning saw cylinder which permits of its being located directly under the doffer roll with its axis well below the axis of the gin saws, and with the provision of a considerable space or working chamber between the gin saw cylinder and the recleaning saw cylinder.

This construction or arrangement is very desirable, in that the space provided between the recleaning saw cylinder and the gin saws permits of the discharge of some hulls and trash through a passage on the side of the downward movement of the teeth of the recleaning saw cylinder, in addition to that which is discharged through a passage on the side of the upward movement of the teeth on the opposite side of the recleaning saw cylinder.

In the accompanying drawing—

The figure is a longitudinal sectional view partly broken away through a machine constructed according to my invention.

Referring now to the drawing, the numeral 1 indicates the casing of a gin, in which casing is provided a roll-box 2 and a breast 3 formed by one wall 4 of the roll-box and the front wall 5 of the casing. Depending from the rear side of the roll-box is a series of ginning ribs 6, and depending from the front wall of the roll-box is a series of huller ribs 7. Mounted in suitable bearings in the end walls of the casing 1 is a gin saw cylinder, the shaft of which is indicated at 8 and one of the saws whereof is indicated at 9. The above parts are of ordinary construction and are practically standard in the modern type of double-rib gin. To make the present invention clear, it may be further stated, however, that the huller ribs 7 are spaced at a sufficiently wide distance apart to permit the seeds to be drawn through the spaces between them by the gin saws, while, at the same time, such spaces are narrow enough to preclude the passage of hulls, trash, and the like, which latter are thereby separated from the cotton as the latter is drawn through the spaces between the huller ribs by the saws, and are removed from the gin in a manner to be presently described. The ginning ribs 6 extend through the spaces between the saws, and each pair of ribs is positioned in close proximity to the sides of one of the gin saws so as to prevent the seeds from being drawn through the spaces between these ribs as the cotton is carried through by the saws. As they are separated from the cotton, the seeds slide down the outer or front faces of the ribs 6 and fall out of the machine.

To accomplish the purposes of my invention, I mount in the breast of the gin a doffer roll 10, which is positioned to rotate in proximity to the gin saws at the point where the latter pass through the spaces between the huller ribs 7. The purpose of this doffer is to remove cotton from the recleaning saws and deliver it to the gin saws, and, in addition, the doffer may be so positioned as to continuously remove any accumulation of hulls and trash from the vicinity of the huller ribs 7, as above indicated.

The doffer roll 10 in its preferred form comprises a cylinder having a series of angle bars or ribs 11 secured about its periphery at suitable distances apart and extending longitudinally of the cylinder. Below the doffer roll 10, I rotatably mount in the end wall of the casing 1 a recleaning saw cylinder, the shaft of which is indicated at 12 and one of the saws whereof is indicated at 13. The recleaning saw cylinder, as in the case of the gin saw cylinder, comprises a series of circular saws suitably spaced apart throughout the length of the cylinder. The recleaning saws, however, are of much less diameter than the gin saws. The driving mechanism for the rotatable parts referred to is not shown, but it is of the conventional kind and so arranged as to drive the gin saws, reclaiming saws and the doffer roll in the respective directions shown by the arrows. That is to say, the gin saws and recleaning saws are rotated in the same direction and the doffer roll in an opposite direction, or counter-clockwise. The exact speeds of rotation of these parts are not important, but it is important that the doffer roll 10 should have a higher surface speed of rotation than the recleaning saw cylinder 13, and that the gin saw cylinder 9 should have a higher surface speed of rotation than the doffer roll 10. The usual R. P. M. of the recleaning saws is 156, of the doffer roll, 500, and of the gin saws, 450. As the gin saws are very much greater in diameter than the doffer roll, they, of course, have a much higher surface speed of rotation for the respective revolutions per minute indicated.

The recleaning saw cylinder has two functions; one to remove cotton from the mixture of cotton and hulls fed into the breast 3 and carry the same past the doffer roll 10 which operates to doff it therefrom and deliver the same to the gin saws; and the other, to engage small wads and locks of cotton not carried up by the gin saws and carry them around to be again doffed by the feed roll and be delivered to the gin saws.

To facilitate the performance of these dual functions without the loss of cotton, I associate with the recleaning saw cylinder at one side a hullboard 14 which is pivotally mounted at 15 and which may be adjusted toward or from the gin saws 13 by a set screw 16, whereby to vary the size of a space 17 for the escape of hulls and trash past one side of the recleaning saws. On the other side of the recleaning saws, I provide a casing member 18 continuing beyond the lower ends of the huller ribs 7, which casing member defines the size of a passage 19 past the saw cylinder on the opposite side to that at which the passage 17 is provided, which permits of the escape of hulls and trash which are separated from the cotton by the action of the gin saws 9. The passages 17 and 19 lead to a common discharge opening 20 defined on the one side by the lower end of the hullboard 14 and on the other by the lower end of the casing member 18. The hulls and trash which fall into the passage 19 are forced out by the teeth of the recleaning saws 13 and discharged through the opening 20, while the small locks of cotton which fall with the trash into this passage are engaged by the teeth of the saws and carried across the discharge gap or opening 20 and back into the breast 3 and around to the doffer roll 10.

The numeral 21 indicates a doffer of any preferred construction rotatably mounted by means of a shaft 22 and which travels at a higher rate of speed than the gin saws 9. This doffer serves in operation to continuously remove the ginned cotton from the saws 9 in the usual manner.

In operation, the cotton mixed with hulls and trash is delivered from any suitable feeding device (not shown) into the breast 3 of the gin, where any loose trash and hulls fall down onto the hullboard 14 and slide through the discharge passage 17 and are discharged through the opening 20. Any hulls and trash which remain entangled with the cotton are carried with the cotton by the recleaning saws 13 up to the doffer roll 10, which is rotating in the direction shown at a greater peripheral speed than the saws 13 and which acts to doff the cotton from the saws, throwing it across a space indicated at 23 into contact with the revolving gin saws 9. This action, and the sudden engagement of the cotton by the gin saws, releases additional hulls and trash and some small locks of cotton, which fall through the space 23 into the passage 19, the hulls being forced out through such passage to the discharge opening 20, while the locks of cotton are forced into engagement with the teeth of the saws 13 and again carried around to the doffer roll 10 where they are doffed and thrown across the space 23 into engagement with the teeth of the gin saws 9. The main body of cotton thrown by the doffer roll 10 onto the gin saws projecting into the space 23 is carried by the gin saws through the spaces between the huller ribs 7, these spaces being wide enough to permit the seed cotton to be carried freely through into the roll-box 2, while narrow enough to strip off the remaining sticks and hulls, which are immediately engaged by the upper portion of the doffer roll 10, carried around and thrown back into the breast 3, whence they are readily discharged through space 17 and opening 20.

The seed cotton, which has been effectively cleaned by the three operations described, is carried by the gin saws into the roll-box 2, where it is ginned by the saws passing through the gin ribs 6, spaced close enough together to prevent seeds going through, the lint being doffed from the back of the gin saws by doffer 21 in the usual manner.

From the above description of the construction and operation of my invention, it will be seen, first, that the recleaning saws 13, in combination with the hullboard 14, defining the size of the passage 17 past the recleaning saws, produces an effective separation of loose trash and hulls from the cotton delivered into the breast 3; second, that the space 23 is sufficient in extent to insure that the cotton, with trash and hulls entangled with it, when doffed from the recleaning saws 13 and thrown across this space, shall be engaged so suddenly by the rapidly revolving gin saws as to shake loose a considerable amount of trash and hulls which fall through the space 23 into the more restricted passage 19, whence they are forced by the recleaning saws through the opening 20, as above described; and, third, that the hulls, sticks and other trash stripped from the cotton by the huller ribs 7 are immediately and positively engaged by the rotating blades 11 of the doffer roll 10 and carried around and thrown back into the breast 3. The position and action of the doffer roll 10 may also be such as to serve to prevent any accumulation or clogging of the ribs 7 at the point where the seed cotton is carried through the spaces between them and where the final separation of sticks and trash is made.

It will be obvious that while the huller ribs 7 are important in this final separation, or in functioning to strip and separate hulls, sticks and other trash which remain entangled with the cotton, they are not essential so far as the removal of any loose hulls and trash is concerned, which first takes place in the breast 3, and again by the separation subsequently made by shaking loose additional hulls and trash when the cotton is thrown by the doffer roll 10 from the recleaning saws 13 through space 23 onto the rapidly revolving gin saws.

It is a characteristic of this invention that the working parts are so positioned and rotated as to not only bring about the desired separation of hulls and trash from the cotton before the seed cotton is carried by the gin saws into the roll-box, but at the same time, all machining or chipping of hulls, sticks and other foreign matter is avoided, since there is only the force of gravity involved in the contact of any hulls or trash with the teeth of the recleaning saws 13, and the space 23 on the opposite side of these saws is sufficiently wide to prevent sticks or other hard substances from being engaged at the same time by the downward movement of the teeth of the recleaning saws 13 and the upward movement of the teeth of the gin saws 9. In the use of the ordinary picker roller in the breast of the gin, hulls, sticks and other hard substances are positively forced downward past the high-speed gin saws moving in an upward direction, which results in chipping or machining the hard substances to such an extent that a great deal of fine trash and shale is produced and thrown by the teeth of the gin saws back into the stream of cotton, and is too fine to be separated by the action of forcing cotton through the spaces between the huller ribs.

As a result of my invention, the grade of cotton from a gin equipped with my improved cleaning mechanism applied to the breast of the gin, is superior to the grade of cotton from a gin equipped with the ordinary picker roller. At the same time, my improved cleaning mechanism will handle and discharge a much larger percentage of hulls, sticks and the like than is possible with the ordinary picker roller, while avoiding the waste of any cotton of value.

I claim:

1. In a huller rib gin, in combination with the breast of the gin, into which the cotton mixed with hulls and trash is adapted to be fed, and with the gin saws, cleaning mechanism mounted in the breast of the gin comprising a recleaning saw cylinder rotating in the same direction as the gin saws, and located at a distance therefrom to provide a passage past the saw cylinder for the escape of loose hulls and trash fed into the breast of the gin, and doffing means positioned to remove cotton from said saw cylinder and project the same onto the teeth of the gin saws.

2. In a huller rib gin, in combination with the breast of the gin, into which the cotton mixed with hulls and trash is adapted to be fed, and with the gin saws, cleaning mechanism mounted in the breast of the gin comprising a recleaning saw cylinder rotating in the same direction as the gin saws, a hullboard located at the side of said saw cylinder remote from the gin saws and defining the size of an opening past said saw cylinder for the escape of loose hulls and trash fed into the breast of the gin, and doffing means positioned to remove cotton from said saw cylinder and project the same onto the teeth of the gin saws.

3. In a huller rib gin, in combination with the breast of the gin, into which the cotton mixed with hulls and trash is adapted to be fed, and with the gin saws, cleaning mechanism mounted in the breast of the gin comprising a recleaning saw cylinder rotating in the same direction as the gin saws, and located at a distance therefrom to provide a passage past the saw cylinder for the escape of hulls and trash separated from the cotton, and doffing means positioned to remove cotton from said saw cylinder and project the same onto the teeth of the gin saws and to remove hulls and trash separated from the cotton by the huller ribs and return the same to that side of the recleaning saw cylinder remote from the gin saws.

4. In a huller rib gin, in combination with the breast of the gin, into which the cotton mixed with hulls and trash is adapted to be fed, and with the gin saws, cleaning mechanism mounted in the breast of the gin comprising a recleaning saw cylinder rotating in the same direction as the gin saws and of greatly reduced diameter as compared with the diameter of the gin saws, a hullboard located at the side of said saw cylinder remote from the gin saws and defining the size of an opening past said saw cylinder for the escape of loose hulls and trash fed into the breast of the gin, and doffing means positioned to remove cotton from said saw cylinder and project the same onto the teeth of the gin saws, the construction providing a space at the side of the saw cylinder contiguous to the gin saws for the escape of hulls and trash separated from the cotton by the combined actions of the doffer and gin saws.

5. In a huller rib gin, in combination with the gin saws, cleaning mechanism mounted in the breast of the gin comprising a recleaning saw cylinder rotating in the same direction as the gin saws and separated therefrom by a working space, and a doffer roll located in doffing relation to said saw cylinder and rotating in an opposite direction thereto at a higher rate of speed and operating to project cotton doffed from the recleaning saws through said space onto the surface of the gin saws.

6. In a huller rib gin, in combination with the gin saws, cleaning mechanism mounted in the breast of the gin comprising a recleaning saw cylinder rotating in the same direction as the gin saws and separated therefrom by a working space and of greatly reduced diameter as compared with the diameter of the gin saws and having its axis located below the plane of the axis of the gin saws, and a doffer roll located in doffing relation to said saw cylinder and rotating in an opposite direction thereto at a higher rate of speed and operating to project cotton doffed from the recleaning saws through said space directly onto the surface of the gin saws.

7. In a huller rib gin, in combination with the gin saws, cleaning mechanism mounted in the breast of the gin comprising a recleaning saw cylinder rotating in the same direction as the gin saws and separated therefrom by a working space and of greatly reduced diameter as compared with the diameter of the gin saws and having its axis located below the plane of the axis of the gin saws, and a doffer roll located in doffing relation to said saw cylinder and rotating in an opposite direction thereto at a higher rate of speed and operating to project cotton doffed from the recleaning saws through said space directly onto the surface of the gin saws, the construction providing a discharge opening for hulls and trash at the underside of said recleaning saw cylinder.

8. A cotton gin comprising, in combination with rotatable gin saws and stationary huller ribs through spaces between which latter a portion of the gin saws project, cleaning mechanism mounted in the breast of the gin comprising a recleaning saw cylinder rotating in the same direction as the gin saws and separated therefrom by a working space and of greatly reduced diameter as compared with the diameter of the gin saws and having its axis located below the plane of the axis of the gin saws, and a doffer roll located above and in doffing relation to said recleaning saw cylinder and rotating in an opposite direction thereto at a higher rate of speed and operating to project cotton doffed by its underside from the recleaning saws through said space directly onto the surface of the gin saws projecting through said huller ribs, said doffer roll being located in sufficiently close proximity to the huller ribs to remove accumulations of hulls and trash therefrom at the points where the gin saws pass between same, and the construction providing an outlet for hulls and trash below the recleaning saw cylinder.

9. A cotton gin comprising, in combination with rotatable gin saws and stationary huller ribs through spaces between which latter a portion of the gin saws project, cleaning mechanism mounted in the breast of the gin comprising a recleaning saw cylinder rotating in the same direction as the gin saws and separated therefrom by a working space, and a doffer roll located in doffing relation to said saw cylinder and rotating in an opposite direction thereto at a higher rate of speed and operating to project cotton doffed from the recleaning saws through said space onto the surface of the gin saws, said doffer roll being located in sufficiently close proximity to the huller ribs to remove accumulations of hulls and trash therefrom at the points where the gin saws pass between same.

10. In a huller rib gin, in combination with the gin saws, cleaning mechanism mounted in the breast of the gin comprising a recleaning saw cylinder rotating in the same direction as the gin saws and separated therefrom by a working space sufficient for the free movement of cotton between them, and a doffer roll located in doffing relation to said saw cylinder and rotating in an opposite direction thereto at a higher rate of speed and operating to project cotton doffed from the recleaning saws through said space onto the surface of the gin saws, the construction of the gin providing passages for the escape of hulls and trash past either side of the saw cylinder, said passages communicating with a common outlet.

11. A cotton gin comprising, in combination with rotatable gin saws and stationary huller ribs through spaces between which latter a portion of the gin saws project, cleaning mechanism mounted in the breast of the gin comprising a recleaning saw cylinder, and a doffer roll positioned and rotated in a manner to doff cotton from the latter and deliver the same to the gin saws, and to remove accumulations of hulls and trash from the huller ribs at the points where the gin saws pass between the latter, and return same to that side of the recleaning saw cylinder remote from the gin saws.

12. A cotton gin comprising, in combination with rotatable gin saws and stationary huller ribs through spaces between which latter a portion of the gin saws project, cleaning mechanism mounted in the breast of the gin comprising a recleaning saw cylinder, a hullboard positioned at the side of said saw cylinder remote from the gin saws and defining the size of a passage for the escape of hulls and trash past said saw cylinder, a casing member located at the opposite side of the saw cylinder and defining a restricted passage past said saw cylinder, said passages communicating with a common discharge opening, the construction providing working spaces on either side of said saw cylinder communicating with the respective passages, and a doffer roll located in proximity to said gin saws and huller ribs at the point where the former pass between the latter and in doffing relation to the recleaning saws, said doffer roll operating to project cotton doffed from the recleaning saws through the space adjacent the gin saws and onto the surface of the gin saws.

13. A cotton gin comprising, in combination with the gin saws operating as to a portion of their surface in the breast of the gin, a doffer roll mounted in operative relation to the gin saws, a recleaning saw cylinder located below said doffer roll and in sufficient proximity thereto to be doffed thereby, the construction of the gin providing an escape passage for hulls and trash past the recleaning saws at each side thereof, the recleaning saw cylinder and doffer roll being so positioned and rotated relative to each other and to the gin saws that the recleaning saws will carry up cotton to the doffer roll, and the latter at its underside will doff cotton from the recleaning saws and discharge the same onto the gin saws.

14. A cotton gin comprising, in combination with the gin saws operating as to a portion of their surface in the breast of the gin, a doffer roll mounted in operative relation to the gin saws, a recleaning saw cylinder located below said doffer roll and in sufficient proximity thereto to be doffed thereby, the construction of the gin providing a working space on either side of the recleaning saw cylinder and a passage for hulls and trash leading from said spaces to a common discharge opening, the recleaning saw cylinder and feed roll being so positioned and rotated relative to each other and to the gin saws that the recleaning saws will carry up cotton and adhering hulls and trash to the doffer roll, the latter will doff cotton from the recleaning saws and project the same through the space on that side of the saw cylinder and onto the surface of the gin saws, and the recleaning saws will force hulls and trash separated from the cotton by the action of the gin saws in said space or chamber through said passage to the outlet opening and will engage and carry up locks of cotton combined with said hulls and trash, to the doffer roll to be again doffed and projected by the latter into the last named space or chamber.

In testimony whereof, I have hereunto set my hand.

JOHN E. MITCHELL.